Feb. 21, 1933.   O. SCHNECKO ET AL   1,898,400
MEANS FOR MANUFACTURING TUBING FROM CELLULOSE
Filed Jan. 20, 1932
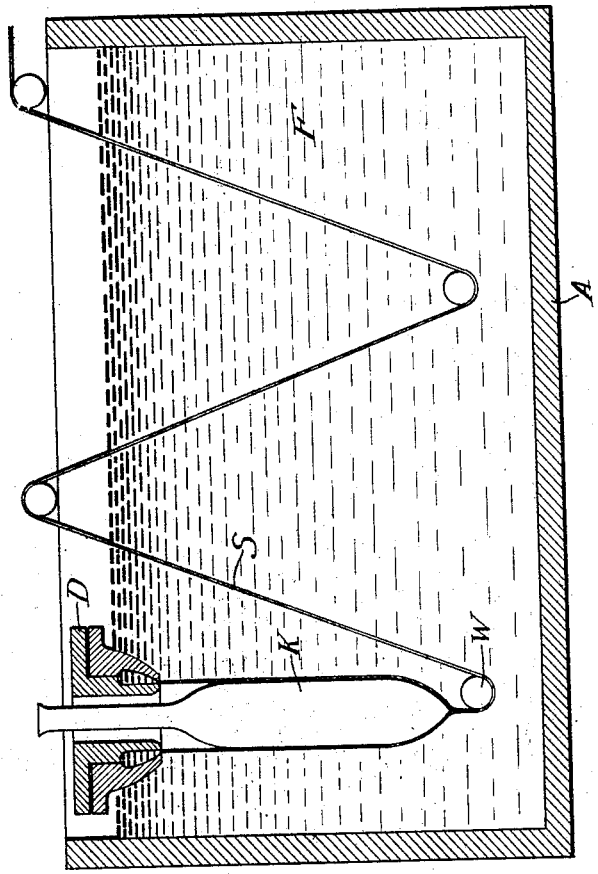
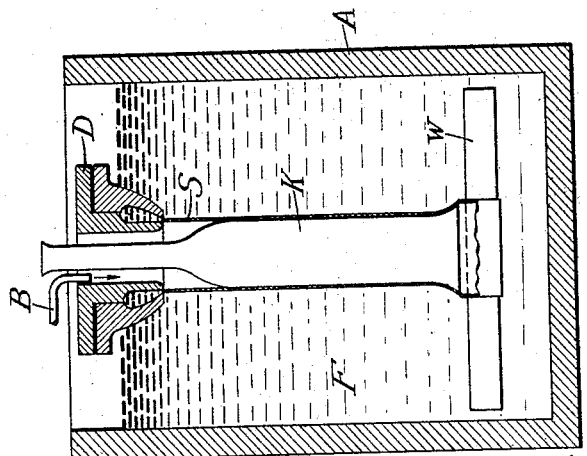

Patented Feb. 21, 1933

1,898,400

UNITED STATES PATENT OFFICE

OTTO SCHNECKO AND WALDEMAR SCHWALBE, OF WIESBADEN, GERMANY, ASSIGNORS TO THE VISKING CORPORATION, OF CHICAGO, ILLINOIS, A CORPORATION OF VIRGINIA

MEANS FOR MANUFACTURING TUBING FROM CELLULOSE

Application filed January 20, 1932, Serial No. 587,788, and in Germany January 23, 1931.

There are a large number of known processes for the manufacture of seamless tubing or sausage casings from regenerated cellulose, in which processes viscose extruded through an annular orifice is guided over a core and is treated with a precipitating bath comprising generally an ammonium salt.

In the process described in German Letters Patent 321,223, dated July 16, 1914, in the name of William Davies Company in Toronto, the viscose is extruded from an annular orifice into the air and is subjected to a precipitating bath which is sprayed against the casing by two nozzles, one nozzle being adapted to spray the interior of the casing and the other being adapted to spray the exterior thereof. During the spraying operation, the casing is drawn over a core expanded by air.

In English Letters Patent 304,717, dated January 25, 1928, in the name of Wolff & Co., Commandit-Gesellschaft auf Aktien et al, a similar process is described, but it differs from the German process described in that the casing is drawn over a glass core and does not pass therefrom to a conveyor. Instead the casing is delivered to a precipitating bath.

In the two processes described above, it is difficult to prevent the casing from being damaged while it is subjected to the sprays of precipitating agents.

In U. S. Patent No. 1,873,685, issued August 23, 1932, in the name of Julius Voss and Arthur Schade and German Patent No. 513,242, dated April 18, 1929, in the name of Kalle & Co. Aktiengesellschaft, apparatus for forming tubing of the kind described is shown. This apparatus comprises an annular orifice immersed in the precipitating bath. A removable core is provided beneath the annular orifice and comprises a spreader at its lower end, over which spreader the tubing passes during the regenerating operation. The spreader consists of a triangularly bent rod.

In practice, some difficulties have developed with respect to the apparatus shown in U. S. Patent No. 1,873,685 and German Patent No. 513,242. Thus the casing tends to wrinkle and adhere to the core which is somewhat smaller in diameter than the casing. These wrinkles tend to become permanent and generally cannot be smoothed out by the spreader.

The present application discloses apparatus which overcomes this disadvantage of the apparatus shown in U. S. Patent, No. 1,873,685 and German Patent No. 513,242. The present invention is embodied in extruding apparatus which comprises means forming an annular orifice through which the viscose is extruded downwardly into a precipitating bath. A tubular core projects downwardly from the extruding means and has its lower end flattened and widened to provide a spreader, the periphery of the spreader being preferably of approximately the same length as the circumference of the tubular portion of the core. The construction is such that during the precipitating operation the casing, which shrinks to some extent, adheres at all times to the core and to the spreader so that it cannot wrinkle. The precipitating agent is introduced into the interior of the casing through the extruding means so that the inner wall of the casing, particularly the part issuing from the annular orifice, is at all times subjected to the precipitating bath. This increases the rapidity of the precipitation so that even when the extrusion is being carried on, at a comparatively high rate of speed, the casing rapidly acquires sufficient strength to keep it from being injured as it is drawn over the core.

The diameter of the tubular core is preferably larger, or at least as large, as the inside diameter of the annular orifice. The core and spreader are preferably formed integral with each other and the core preferably comprises a tube which is flattened at its lower end in the manner described above. If desired, the core may diminish slightly in diameter in a downward direction, or its spreader end may be made somewhat smaller so that its periphery is somewhat less in length than the circumference of the cylindrical portion of the core. However, the core and spreader should have circumferences which are not less than the inside circumference of the tubing after it has been subjected to the precipitating bath. In order to have the casing flatten out so much as possible, it is preferable to make the spreader end of the core so flat as possible. The spreader portion of the core may be longer than the tubular portion thereof if it is so desired. The roller or rod, over which the casing is drawn, is preferably positioned directly below the core.

In the drawing:

Figure 1 is a vertical section taken through apparatus which embodies the invention, and Figure 2 is a vertical section taken centrally of Figure 1.

Referring to the drawing, A is a tub holding a precipitating bath F, into which bath F an extruding nozzle D projects. The nozzle D has an annular orifice immersed in the bath F. The viscose extruded from the annular orifice of the nozzle D is advanced over a core K which is preferably shaped so that it resembles a bottle in form. The lower end of the core K is flattened or tapered so that it terminates in a substantially straight edge. This construction causes the tubing to leave the core in a collapsed condition so that it resembles a band or ribbon. A nozzle B disposed above the nozzle D and projecting into it delivers the precipitating bath into the interior of the tubing being extruded by the nozzle D. The tubing passes from the core K to a roller W and then passes over a plurality of rollers arranged above and in the bath F. The tubing is shown at S.

While the drawing shows the core and spreader made of one piece, it will be readily understood that it may be fabricated from several pieces. The distance between the annular orifice of the nozzle D and the point where the tubing first comes into contact with core K depends upon the diameter of the casing which is being produced. When the tubing is of relatively small diameter, this distance may be relatively long, whereas with casings of larger diameter, it is preferable that this distance does not exceed a few centimeters in length.

The core K is preferably hollow and its upper portion is preferably of reduced diameter so that a sufficient quantity of the precipitating bath will be disposed adjacent the inner surface of the tubing as it passes from the annular orifice. It will be noted that the lower end of the core K is wedge-shaped and that the width of the wedge is such that it causes the tubing to contact with the entire surface of the wedge. This prevents the tubing from becoming wrinkled.

We claim:

1. Apparatus for forming seamless cellulose tubing, which apparatus comprises means for extruding viscose from an annular orifice into a bath, and a core over which said tubing is advanced after it leaves said orifice, the posterior end of the core being wedge-shaped to flatten the tubing.

2. Apparatus of the character specified in claim 1, in which the wedge-shaped end of the core is wider than the other portions of the core over which the tubing is advanced.

3. Apparatus as defined in claim 1, in which the core is substantially cylindrical and terminates in a wedge-shaped end.

4. Apparatus as defined in claim 1, in which the core is substantially cylindrical and terminates in the wedge-shaped portion which is wider than the diameter of said cylindrical portion of the core.

5. Apparatus as defined in claim 1, in which the inside surface of the tubing is subjected to the bath before it comes into contact with the core.

6. Apparatus as defined in claim 1, in which the core has a substantially cylindrical portion which is at least as large in diameter as the tubing after it shrinks through the action of the bath.

In testimony whereof, we affix our signatures.

OTTO SCHNECKO.
WALDEMAR SCHWALBE.